United States Patent
Takayama

(10) Patent No.: US 8,985,569 B2
(45) Date of Patent: Mar. 24, 2015

(54) DOCUMENT-SHEET CONVEYANCE DEVICE AND IMAGE FORMING APPARATUS

(71) Applicant: Kenji Takayama, Kanagawa (JP)

(72) Inventor: Kenji Takayama, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 14/217,575

(22) Filed: Mar. 18, 2014

(65) Prior Publication Data

US 2014/0284865 A1 Sep. 25, 2014

(30) Foreign Application Priority Data

Mar. 25, 2013 (JP) .................................. 2013-062282

(51) Int. Cl.
| | | |
|---|---|---|
| *B65H 5/22* | (2006.01) | |
| *B65H 83/00* | (2006.01) | |
| *B65H 85/00* | (2006.01) | |
| *H04N 1/00* | (2006.01) | |

(52) U.S. Cl.
CPC ................................ *H04N 1/00615* (2013.01)
USPC ............................ 271/3.14; 271/3.2; 358/498

(58) Field of Classification Search
USPC .......... 271/3.14, 3.2; 399/365, 379, 380, 206; 358/496, 498
See application file for complete search history.

(56) References Cited

U.S. PATENT DOCUMENTS

| | | | | |
|---|---|---|---|---|
| 5,550,650 | A * | 8/1996 | Pan ................................ | 358/474 |
| 8,289,591 | B2 * | 10/2012 | Zhu ............................... | 358/498 |
| 2010/0253984 | A1 * | 10/2010 | Zhu ............................... | 358/498 |
| 2011/0170149 | A1 | 7/2011 | Kimura | |
| 2011/0188099 | A1 * | 8/2011 | Lee ............................... | 358/498 |

FOREIGN PATENT DOCUMENTS

| | | |
|---|---|---|
| JP | 10-229472 | 8/1998 |
| JP | 2009-143696 | 7/2009 |
| JP | 2011-144008 | 7/2011 |
| JP | 2013-038480 | 2/2013 |

* cited by examiner

*Primary Examiner* — David H Bollinger
(74) *Attorney, Agent, or Firm* — Harness, Dickey & Pierce, P.L.C.

(57) ABSTRACT

A document conveyance device includes: a reader reading a document-sheet passing on a contact glass; a white plate being placed opposite to the contact glass; a first conveyance roller and a first driven roller placed upstream of the reader in a sheet conveying direction; a second conveyance roller and a second driven roller placed downstream of the reader in the sheet conveying direction; a holding member configured to hold rotatably the first and second driven roller; a spacer configured to support the holding member and include one or more of support planes different in height; wherein a support plane selected from the one or more support planes in accordance with a thickness of the document-sheet is moved manually to support the holding member, and the white plate is configured to lift upward from the contact glass plate by a forehead of the sheet passing through the contact glass plate.

4 Claims, 8 Drawing Sheets

DOCUMENT-SHEET CONVEYANCE DEVICE AND IMAGE FORMING APPARATUS

CROSS-REFERENCE TO RELATED APPLICATIONS

The present application claims priority to and incorporates by reference the entire contents of Japanese Patent Application No. 2013-062282 filed in Japan on Mar. 25, 2013.

BACKGROUND OF THE INVENTION

1. Field of the Invention

The present invention generally relates to a document-sheet conveyance device and an image forming apparatus. Specifically, the present invention relates to a document-sheet conveyance device that reads a document-sheet with conveying the document-sheet, and the image forming apparatus including the document-sheet conveyance device.

2. Description of the Related Art

A broad wide copier that uses a transfer roll paper is known as an image forming apparatus including a document-sheet conveyance device. In the broad wide copier, sheet-thickness of the document-sheet that can be read is, generally, in an extent from 0.035 mm to 1 mm. However, there has been needed to read a more thicker document-sheet having a thickness of 0.035 mm to 10 mm, for example.

There is disclosed a document-sheet conveyance device that can change a gap between a pair of conveyance rollers that pinch a document-sheet therebetween and convey the document-sheet in accordance with the thickness of the document-sheet, for example, in Japanese Patent Application Laid-open No. 2009-143696. The document-sheet conveyance device disclosed in Japanese Patent Application Laid-open No. 2009-143696 includes: a reader that reads a document-sheet; a first conveyance roller and a first driven roller that are provided upstream of the reader in a sheet conveying direction and pinch and convey the document-sheet; a second conveyance roller and a second driven roller that are provided downstream of the reader in the sheet conveying direction and pinch and convey the document; a document-sheet thickness sensor that is provided upstream of the reader in the document-sheet conveying direction and determines a thickness of the document-sheet; a first changing mechanism that changes the gap between the first conveyance roller and the first driven roller based on the thickness of the document-sheet determined by the document-sheet thickness sensor; and a second changing mechanism that changes the gap between the second conveyance roller and the second driven roller based on the thickness of the document-sheet determined by the document-sheet thickness sensor.

In addition, the document-sheet conveyance device disclosed in Japanese Patent Application Laid-open No. 2009-143696 also includes a third changing mechanism that changes a gap between a contact glass plate included in a reading unit and a white plate placed opposite to the contact glass plate based on the thickness of the document-sheet determined by the document-sheet thickness sensor.

In the conventional document-sheet conveyance device, the first and the second changing mechanism are configured to automatically change, using step motors thereof, the gap between the first conveyance roller and the first driven roller, and the gap between the second conveyance roller and the second driven roller, based on the thickness of the document-sheet determined by the document-sheet thickness sensor. The third changing mechanism is also configured to automatically change, using a stepping motor thereof, the gap between the contact glass plate and the white plate opposite to the contact glass plate based on the thickness of the document-sheet determined by the document-sheet thickness sensor. Therefore, the above-mentioned conventional document-sheet conveyance device can read a multi-kind of document-sheets being different in thickness, but due to the mechanism, a cost of the device is increased.

In light of the foregoing, there is a need to provide a low-cost document-sheet conveyance device that reads the multi-kind of document-sheets being different in thickness and an image forming apparatus including the document-sheet conveyance device.

SUMMARY OF THE INVENTION

It is an object of the present invention to at least partially solve the problems in the conventional technology.

According to the present invention, there is provided a document-sheet conveyance device comprising: a reader configured to read a document-sheet passing through on a contact glass plate; a white plate configured to be placed opposite to the contact glass plate; a first conveyance roller and a first driven roller placed upstream of the reader in a sheet conveying direction, and configured to nip and convey the document-sheet to the reader; a second conveyance roller and a second driven roller placed downstream of the reader in the sheet conveying direction, and configured to nip and convey the document-sheet having been read by the reader to a subsequent stage; a holding member configured to hold rotatably the first and second driven roller; a spacer configured to support the holding member and include one or more of support planes different in height; wherein a support plane selected from among the one or more support planes of the spacer in accordance with a thickness of the document-sheet is moved manually to support the holding member, and the white plate is configured to lift upward from the contact glass plate by a forehead of the sheet passing through the contact glass plate.

The present invention also provides an image forming apparatus including a document-sheet conveyance device, wherein the document-sheet conveyance device comprises: a reader configured to read a document-sheet passing through on a contact glass plate; a white plate configured to be placed opposed to the contact glass; a first conveyance roller and a first driven roller placed upstream of the reader in a sheet conveying direction, and configured to nip and convey the document-sheet to the reader; a second conveyance roller and a second driven roller placed downstream of the reader in the sheet conveying direction, and configured to nip and convey the document-sheet having been read by the reader to a subsequent stage; a holding member configured to hold rotatably the first and second driven roller; a spacer configured to support the holding member and include one or more of support planes different in height; wherein a support plane selected from among the one or more support planes of the spacer in accordance with a thickness of the document-sheet is moved manually to support the holding member, and the white plate is configured to lift upward from the contact glass plate by a forehead of the sheet passing through the contact glass plate.

DETAILED DESCRIPTION OF THE PREFERRED EMBODIMENTS

An exemplary embodiment is described in detail below with reference to the accompanying drawings. The following embodiment is not intended to limit the scope of the invention.

FIGS. 1 to 9 illustrate an embodiment of a document-sheet conveyance device and an embodiment of an image forming apparatus including the document-sheet conveyance device. The image forming apparatus of the embodiment is a broad wide copier that uses a role-type transfer paper, and cuts off the role-type transfer paper in accordance with a length of the document-sheet.

Figure 1:
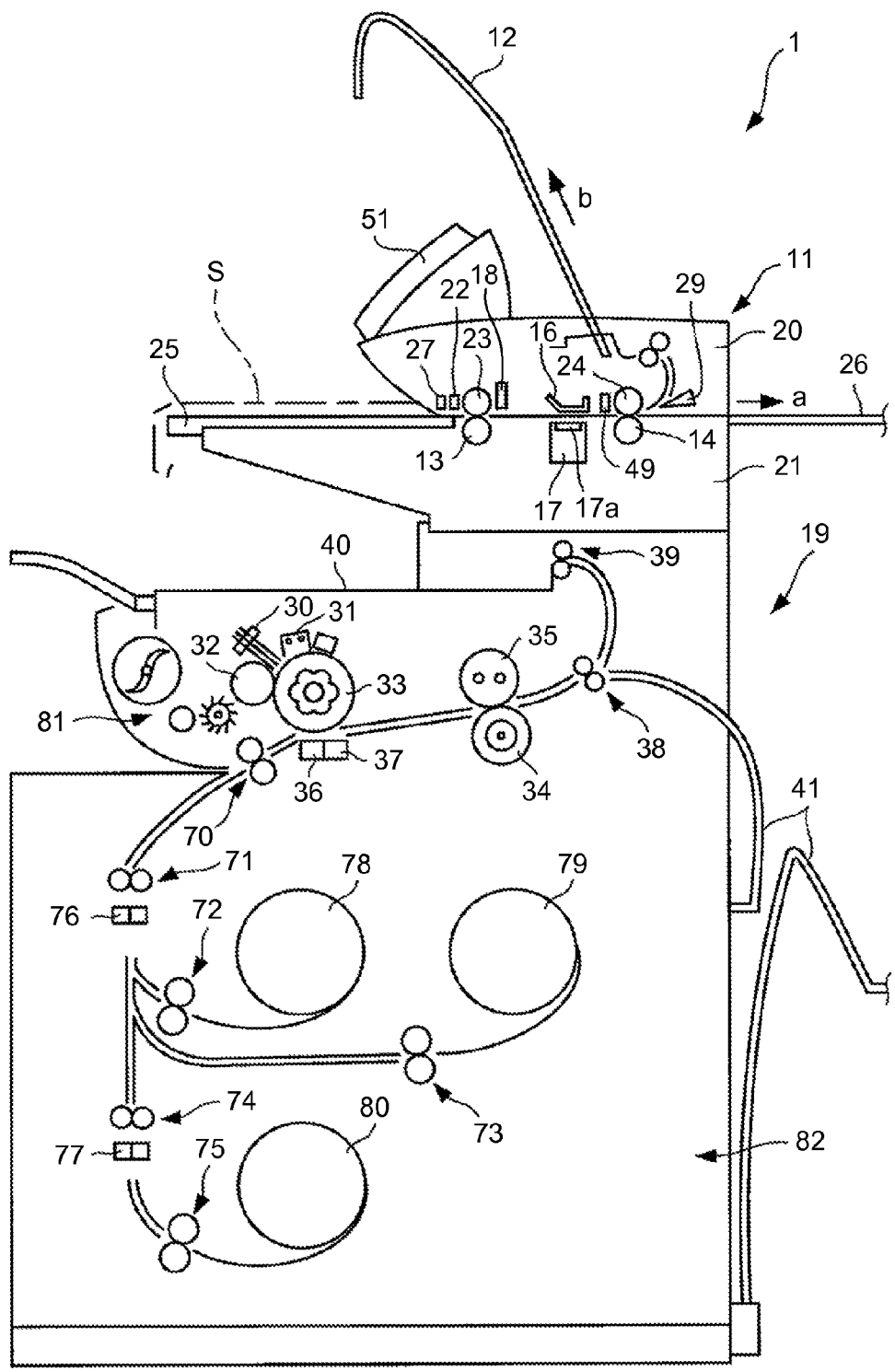
FIG. 1 is a schematic diagram illustrating an image forming apparatus including the document-sheet conveyance device according to an embodiment of the present invention.
Figure 2:
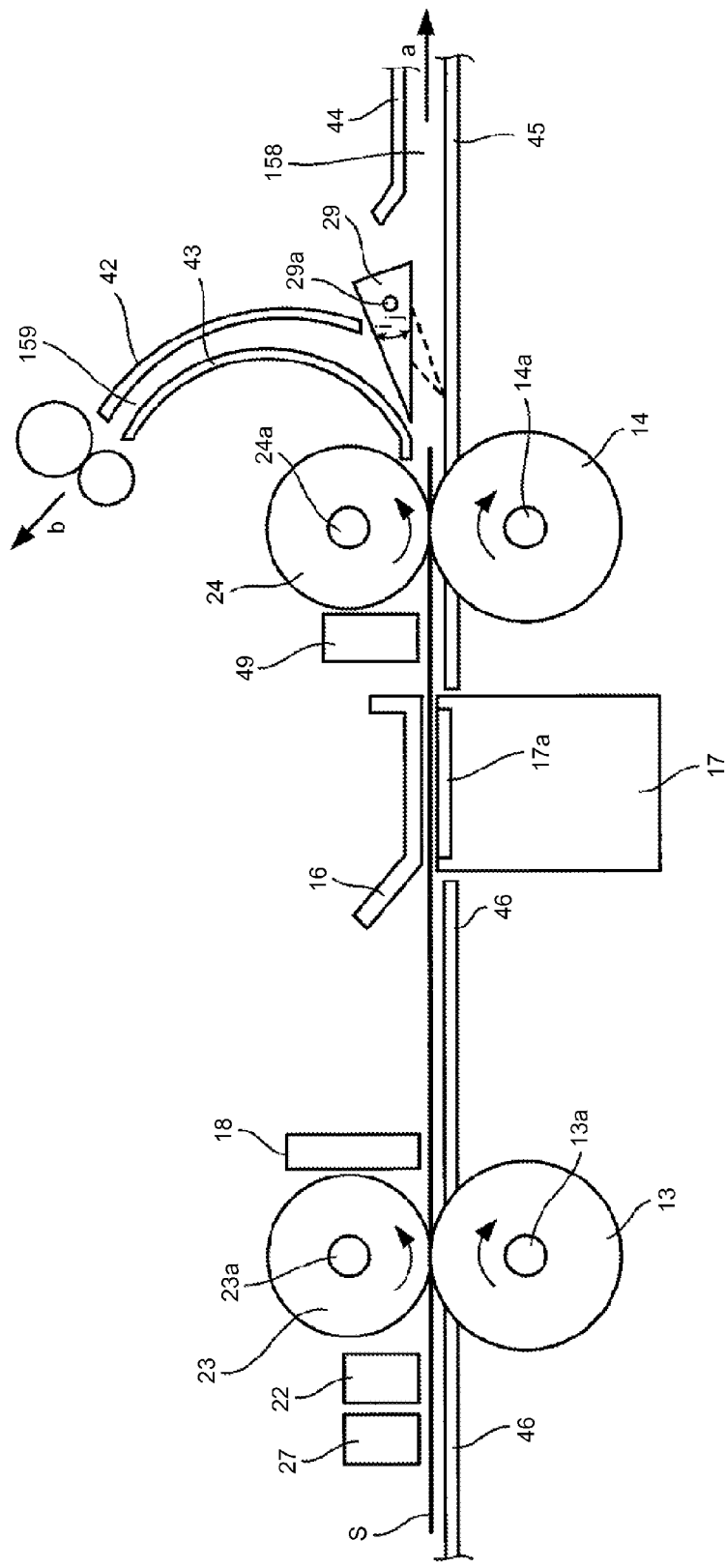
FIG. 2 is a schematic diagram illustrating the document-sheet conveyance device according to the embodiment.

FIG. 1 illustrates a schematic diagram showing an inside configuration of an image forming apparatus 1 including a document-sheet conveyance device 11. FIG. 2 illustrates a schematic diagram illustrating the document-sheet conveyance device 11.

As shown in FIG. 1, the image forming apparatus 1 according to the embodiment includes an image forming apparatus main body 19, and the document conveyance device 11 mounted on the image forming apparatus main body 19.

As shown in FIG. 1 and FIG. 2, the document-sheet conveyance device 11 conveys a sheet-like document (document-sheet) S to a reader 17. And, the document-sheet conveyance device 11 conveys the document-sheet S read by the reader 17 in a direction indicated by an arrowed line a to discharge the document-sheet S to a first document-sheet discharging sheet discharging tray provided backward (or back side) of the document-sheet conveyance device 11 in accordance with a predetermined operation mode (that is a backward sheet-discharge mode or a forward sheet-discharge mode) and the thickness of the document-sheet S. Alternatively, the document-sheet conveyance device 11 guides the document-sheet S read by the reader 17 in a direction indicated by an arrowed line b to discharge the document-sheet 2 to a second document-sheet discharging tray 12 in accordance with the predetermined operation and the thickness of the document-sheet S.

Hereinafter, the forward (or a front side) of the device represents a side that a display-screen of an operation display 51 are facing. The backward (or a rear side) of the device represents an opposite side to the side that the display-screen of the operation display 51 are facing, namely, a side of existing the first sheet discharging tray 26 where the document-sheet S is discharged in case of the backward output mode.

The document-sheet conveyance device 11 includes the reader 17 that reads the document-sheet S passing through on a contact glass plate 17a, and a white plate 16 placed opposite to the contact glass plate 17a. The document-sheet conveyance device 11 further includes a first conveyance roller 13 and a first driven roller 23 that are provided upstream of the reader 17 in a sheet conveying direction and pinch the document-sheet S to convey the document-sheet S to the reader 17, and a second conveyance roller 14 and a second driven roller 24 that are provided downstream of the reader 17 in the sheet conveying direction and nip the document-sheet S read by the reader 17 to convey the document-sheet S to a subsequent stage. In the embodiment, the document-sheet S is conveyed to the first sheet discharging tray 26 or to the second sheet discharging tray 12. And, in the embodiment, the first driven roller 23 is configured to be in contact with the first conveyance roller 13 with a pressure and to be driven by the first conveyance roller 13 first conveyance roller, and the second driven roller 24 is also configured to be in contact with the second conveyance roller 14 with a pressure and to be driven by the second conveyance roller 14 second conveyance roller.

Hereinafter, the first conveyance roller 13 and the first driven roller 23 may be collectively referred to as a pair of first conveyance rollers. Also, the second conveyance roller 14 and the second driven roller 24 may be collectively referred as to a pair of second conveyance rollers.

The document-sheet conveyance device 11 includes an upper unit 20 and a lower unit 21 that are connected with each other by a connecter such as a hinge or the like (not shown). The upper unit 20 is connected, in an openable and closeable state, to the lower unit 21 with the connector. The operation display 51 and the second sheet discharging tray 12 are installed on the upper unit 20 with facing the forward of the device 11.

The second sheet discharging tray 12 is made of metal wires formed in comb-teeth-like form. The second sheet discharging tray 12 is mounted on the device 11 so as to be obliquely raised from backward to forward of the device 11, and is configured to hold the document-sheet S that has been reversed and discharged in the second discharging tray 12 so as to be able to be picked up from the forward side of the device 11 the document-sheet S.

The operation display 51 includes a group of keys consisting of, for example, a start key, ten keys, clear/stop keys, function keys, Yes/No keys, cursor keys, an initial setting key, mode keys and the like; a liquid crystal touch panel; a speaker or the like, all of that are not shown in drawings. Thereby a user can set an operation mode and enter an operation start command and/or an operation stop command, for example.

The operation display 51 displays, on a liquid crystal display panel, copy number, a status of the apparatus, and the rest, and displays accordingly function keys in accordance with the status of the apparatus.

The reader 17 includes a light source, focus lens, shading plates, contact image sensors (CIS) and the like, all of that being not shown, and the contact glass plate 17a. The document-sheets S that are inserted and fed from the forward side of the device 11 in sequence are exposed to irradiation from the light source. Reflected light from the document-sheets are focused on a light receiving surface of the CIS via mirrors and the focus lens, and image patterns of the focused images of the document-sheets are converted into image signals (i.e., image data) in sequence.

Additionally, provided above the contact glass plate 17a being in contact with the document-sheet S is a white plate 16 that causes the document-sheet S to be depressed onto the contact glass plate 17a and functions as white reference of scanned images.

Additionally, when the reader 17 uses CIS, it is important to keep conveying speed of the document-sheet S while keeping a distance between the reader 17 and sheet S constant in order to obtain high quality scanned images that are completely focused without any jitters or the like.

Figure 3:
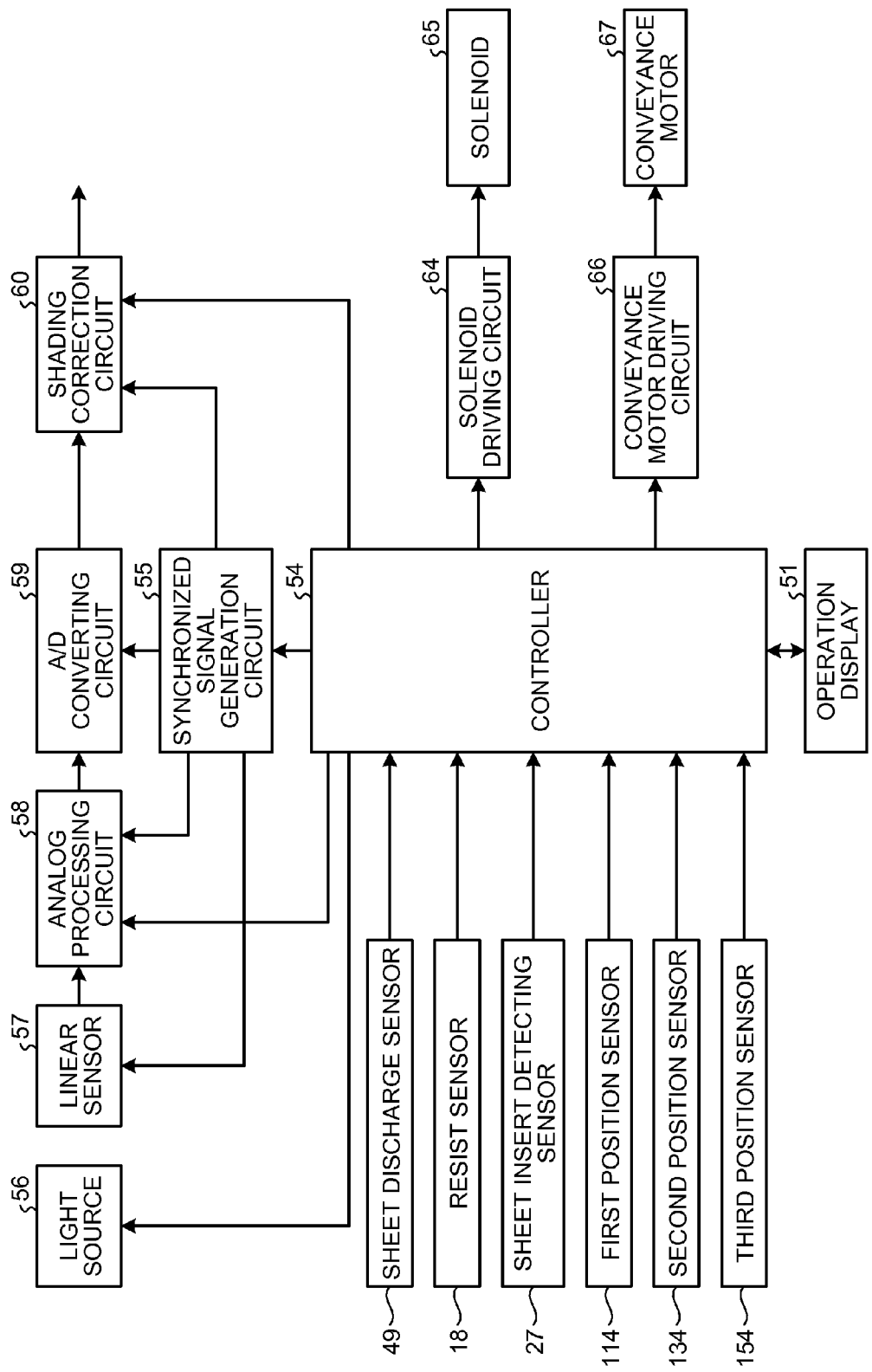
FIG. 3 is a block diagram illustrating a configuration of a controller included in the document-sheet conveyance device according to the embodiment.

Provided downstream near the second conveyance roller 14, that is, in the vicinity of the second conveyance roller 14 between the second conveyance roller 14 and the first sheet discharging tray 26 is a bifurcating claw 29 that is rotated around a rotation axis 29a as the central axis thereof by driving of a solenoid 65 (see FIG. 3).

the after-read document-sheet S is guided, by the bifurcating claw 29, to the first sheet discharging tray 26 or to the second sheet discharging tray 12.

Specifically, as shown in FIG. 2, the bifurcating claw 29 rotates, in forward conveyance mode, to a direction indicated by arrowed line j, and guides the after-read document-sheet S into a second discharge path 159 that is formed by curved discharge guide members 42, 43 to curve the after-read document-sheet S, thereby to change a discharging direction of the document-sheet so as to discharge the document-sheet to the second discharging tray 12. Alternatively, the bifurcating claw 29 rotates, in the backward discharging mode, to a direction indicated by arrowed line i, and guides the after-read document-sheet S into a first discharge path 158 formed by liner output guide members 44, 45 to discharge the document-sheet S to the first discharging tray 26 without changing the discharging direction.

As shown in FIG. 1, a document-sheet table 25 is provided on a forehead surface of a lower unit 21, and the first sheet discharging tray is attached to a rear end face of the lower unit 21 with projecting from the rear end.

The sheet table 25 is configured to receive thereon the document-sheet S so that a plane to be read of the document-sheet is faced downward, and to guide the document-sheet S to a nip between the first conveyance roller 13 and the first driven roller 23.

A resist sensor 18 being an optical reflective sensor is provided upstream of the reader 17. The resist sensor 18 is configured to detect a tip of the document-sheet S to be switched on-state, and detect an end of the document-sheet S to be switched off-state. The first conveyance roller 13 and the second conveyance roller 14 stop driving thereof based on a timing when the resist sensor 18 detects the end of the document-sheet S A sheet size sensor 22 and a sheet insert detecting sensor 27 are provided at an entrance of sheet conveyance path of the document conveyance device 11, namely upstream of the vicinity of the first conveyance roller 13. The sheet size sensor 22 is configured to detect the size of the document-sheet S, and the first conveyance roller 13 is configured to detect whether or not the document-sheet S is inserted to the sheet conveyance path.

In case where the sheet size sensor 22 is configured to also detest whether or not the document-sheet S is inserted to the sheet conveyance path, the sheet insert detecting sensor 27 can be omitted.

The first sheet discharging tray 26 is made of a metal wire formed in comb-teeth-like form, and is configured to incline gently rising from upstream to downstream of the sheet conveying direction to receive thereon the document-sheet S discharged from the second conveyance roller 14 with an extended state.

Provided upstream of the reader 17 in the sheet conveying direction is the above described first conveyance roller 13 and the first driven roller 23 that is in contact with the first conveyance roller 13 with a pressure and driven by the first conveyance roller 13. Also, provided downstream of the reader 10 in the sheet conveying direction is the above described second conveyance roller 14 and the second driven roller 24 that is in contact with the second conveyance roller 23 with a pressure and driven by the second conveyance roller 23.

As shown in FIG. 2, the second conveyance roller 14 is made of a fluorine-based rubber, and is configured to consist of a plurality of the same that are provided in a direction of and on a metallic axis 14a of the second conveyance roller 14. The first conveyance roller 13 is made of and configured as similar to the above-described second conveyance roller 14.

The second driven roller 24 is made of a resin, and is configured to consist of a plurality of the same that are provided in a direction of and on a metallic axis 24a of the second driven roller 24. The first driven roller 23 is made of and configured as similar to the above-described second driven roller 24.

The first conveyance roller 13 and the second conveyance roller 14 are driven by a conveyance motor 67 (see FIG. 3) with a drive force transmitting means including a timing belt.

Driving of the first conveyance roller 13 is controlled via a not-shown electromagnetic brake and clutch. Upon receiving a sheet-inserted-detection signal, the electromagnetic brake and clutch is engaged to transmit the driving force of the conveyance motor 67 to the first conveyance roller 13. And, from when the fore-end of the document-sheet S is passed the second conveyance roller 14 to when the rear-end of the document-sheet is passed through the sheet insert detecting sensor 27, the electromagnetic brake and clutch is un-engaged, thereby inserting a next document-sheet S is prevented until the foregoing document-sheet S has discharged from the document-sheet conveyance device 11.

In addition, provided between the document-sheet table 25 and the second conveyance roller 14 (and the second driven roller 24) is a conveyance guide member 46 that forms the sheet conveyance path for conveying the document-sheet S.

As shown in FIG. 1, an image forming apparatus main body 19 is placed under the document-sheet conveyance device 11. The image forming apparatus body 19 includes a transfer paper supply unit 82 housing therein transfer papers 78, 79 and 80, and an image forming unit 81 performing image formation on the transfer papers 78, 79 and 80.

The image forming unit 81 includes a drum-like shaped photoreceptor 33 and also includes, about the photoreceptor 33 and in an order of an electrophotographic process, an electrical charger 31, a writing unit 30, a developing unit 32, a transfer charger 36, a separate charger 37 and the like.

A writing unit 30 configures a laser writing optical unit system including a laser emitting unit (including a laser diode, a polygon mirror, etc.), a focus lens, a mirrors and the like.

And, provided downstream of a transferring position of the photoreceptor 33 in the conveyance direction are a fixing roller 35, a compressing roller 34, a pair of discharging rollers 38, 39 and sheet discharging trays 40, 41.

Provided under the image forming unit 81 is a transfer paper supplying unit 82 that housing therein rolled transfer papers 78, 79 and 80 that are detachably held within the image forming apparatus main body 19.

Each of the transfer papers 78, 79 and 80 is cut by cutters 76, 77 in accordance with the length of the document-sheet S, as well as conveyed by pairs of conveyance rollers 71 to 75 to an image transfer position side of the photoreceptor 33.

Thus, either one of transfer papers 78, 79 and 80 is selected and cut in a desired length in accordance with a detected length of the document-sheet S detected in the document-sheet conveyance device 11 side, and the cut transfer paper is conveyed by the pairs of sheet conveyance rollers 71 to 75 to the image transferring position of photoreceptor 33.

As to the photoreceptor 33 being rotationally driven in a sub-scanning direction, an electrostatic latent image is formed on the photoreceptor 33 by a writing unit 30 and a toner image is formed on the photoreceptor 33 by a developing unit 32.

The transfer paper having been cut and transferred by means of the pairs of conveyance rollers 71 to 75 is conveyed by a not-shown conveyance belt with being synchronized with a moving of a forehead of the tonner image on the photoreceptor 33, and is transferred with the tonner image from the photoreceptor 33.

The transfer paper to which the tonner image is transferred is processed fixing by means of the fixing roller 35 and the compressing roller 34, and is discharged into the sheet discharging trays 40 or 41 in accordance with the size of the cut transfer paper through the pairs of discharging rollers 38, 39.

FIG. 3 is an exemplary block diagram of controller 54 of the document-sheet conveyance device 11.

As illustrated in FIG. 3, a controller 54 receives inputs such as a mode setting signal from the operation display 51; detecting signals from the sheet insert detecting sensor 27, the resist sensor 18, a sheet discharge sensor 49, a first position sensor 114, a second position sensor 134, a third position sensor 154 and the like. The controller 54 outputs a signal instructing to drive the solenoid 65 to a solenoid driving circuit 64 that drives a solenoid 65 based on the inputs. Specifically, the controller 54 includes a CPU, a memory (e.g., ROM, RAM, non-volatile memory, etc.), an input/output unit, an interface and the like.

A memory included in the controller 54 stores a reference value for comparing with the thickness of the document-sheet S when the bifurcating claw 29 is moved to switch the conveyance path.

Furthermore, the controller 54 performs controls of a synchronized signal generation circuit 55, a driving of a conveyance motor 67 through a conveyance motor driving circuit 66, a flashing of a light source 56 and the like.

The controls allow the document-sheet conveyance device 11 according to the embodiment to perform each of operations including the conveyance of the document-sheet S at a predetermined rate, and the reading of the document-sheet S.

In the embodiment, the conveyance motor 67 is formed with a stepping motor, thus the controller 54 can easily obtain a conveyance distance corresponding to the driving steps, by multiplying the number of driving steps (i.e., the number of pulse) by a conveyance distance per one step, for example.

The controller 54 also includes a sheet insertion processing timer (not shown). The sheet insertion processing timer defines delay time from a detection of the document-sheet S by the sheet insert detecting sensor 27 to a starting of the document-sheet. In the embodiment, the delay time is set from 1 to 3 seconds.

That is, the sheet insertion processing timer is configured to allow leeway for setting the document-sheet S. For example, in some cases where although the sheet insert detecting sensor 27 detects the document-sheet S, the sheet is not completely inserted yet, or where the document-sheet S is not inserted in straight direction, delay time set by the sheet insertion processing timer allows an operator to fix errors and reset the sheet adequately.

In this example, delay time by the sheet insertion processing timer is set at 1 to 3 seconds, however it is preferably to adjust the delay time to be shorter or longer according to the learning level of the operator or in accordance with the size of the document-sheet S and the like. In the embodiment, the operator can adjust the delay time via the operation display 51.

The synchronized signal generation circuit 55 is configured to provide various signals such as a clock signal, an address signal and the like to a linear sensor 57, an analog processing circuit 58, an A/D converting circuit 59 and a shading correction circuit 60.

The analog processing circuit 58 is configured to adjust an intensity level of analog image signal from the linear sensor 57 to execute a sample-holding and an automatic gain controlling (AGC) to the adjusted analog image signal.

The A/D converting circuit 59 is configured to convert the analog image signal into an 8-bit digital image signal.

A not-shown auto gain control circuit controls the AGC amplification so that maximum value of output in main scan direction of the A/D converting circuit 59 comes into a predetermined value (e.g., 220) when the document-sheet S is not existed between the contact glass plate 17a and the white plate 16.

The shading correction circuit 60 is configured to perform shading correction so as to correct fluctuation in a main scan direction of the distribution amount of light emitted from the light source 56 which illuminates the document-sheet S, and fluctuation of image signal in main scan direction caused by characteristics of outputs from CCD which forms the linear sensor 57 to the A/D converting circuit 59.

In process of shading correction, correction process is performed every pixel in the linear sensor 57 by using the following formula.

$$\text{Shading processed data} = \{(\text{document-sheet image data})/(\text{reference data})\} * 255$$

Here, as the reference data, it is used the output data from the A/D converting circuit 59 when the document-sheet S is not existed between the contact glass plate 17a and the white plate 16 after performing AGC.

The detailed descriptions of the AGC and the shading process are omitted because the both are similar as that in the conventional art.

The aforementioned AGC operation is configured to implemented, for example, upon turning on a main switch of the image forming apparatus main body 19 connected to the document-sheet conveyance device 11.

The driving force of the conveyance motor 67 is transmitted to the first conveyance roller 13 only when a not-shown feeding clutch is ON-state, and is transmitted to the second conveyance roller 14 only when a not-shown sheet discharging clutch is ON-state.

Figure 6:
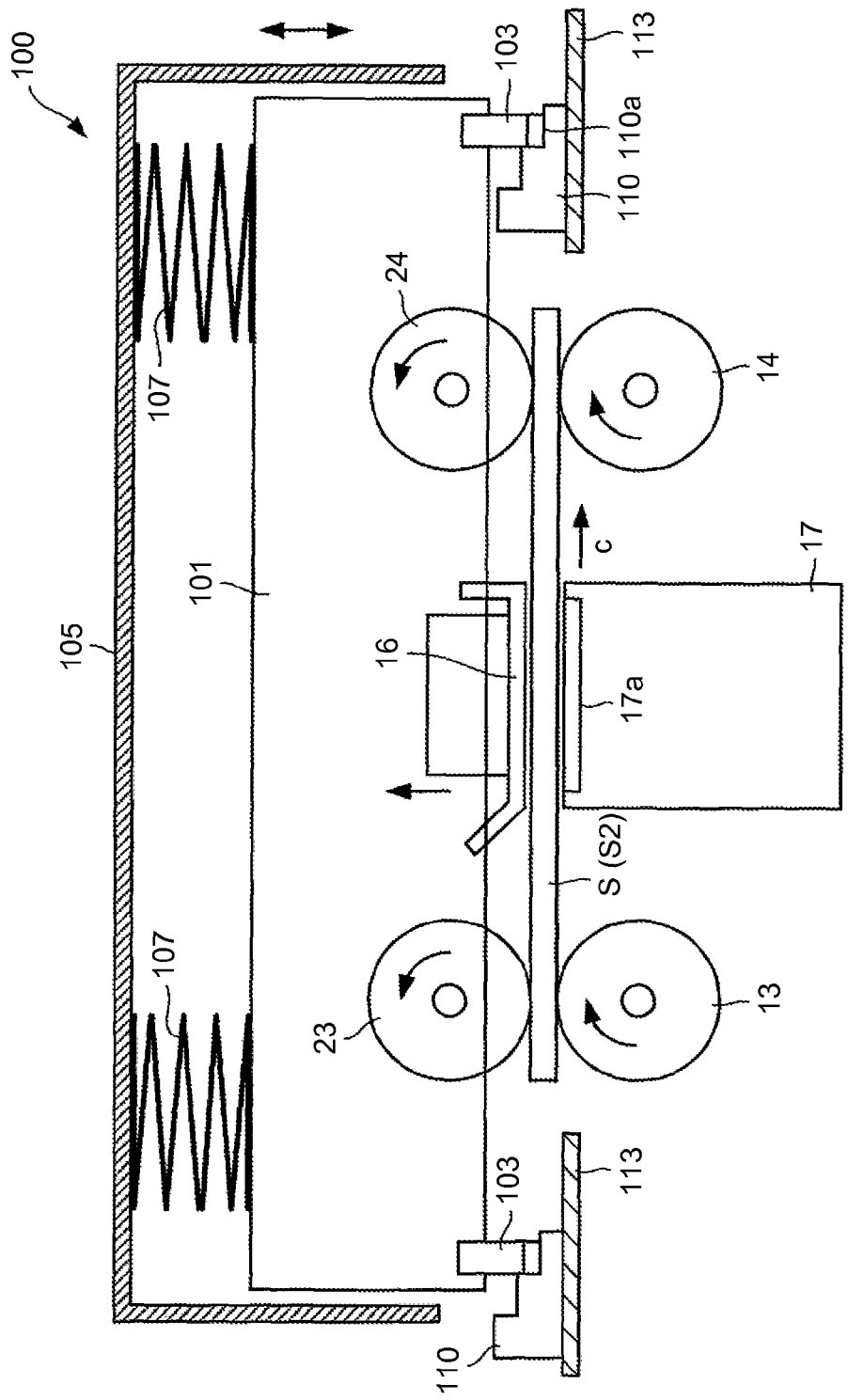
FIG. 6 is a partially cross-sectional view for explaining a conveyance of a document-sheet having thickness of a second thickness greater than the first thickness in the document-sheet conveyance device according to the embodiment.
Figure 7:
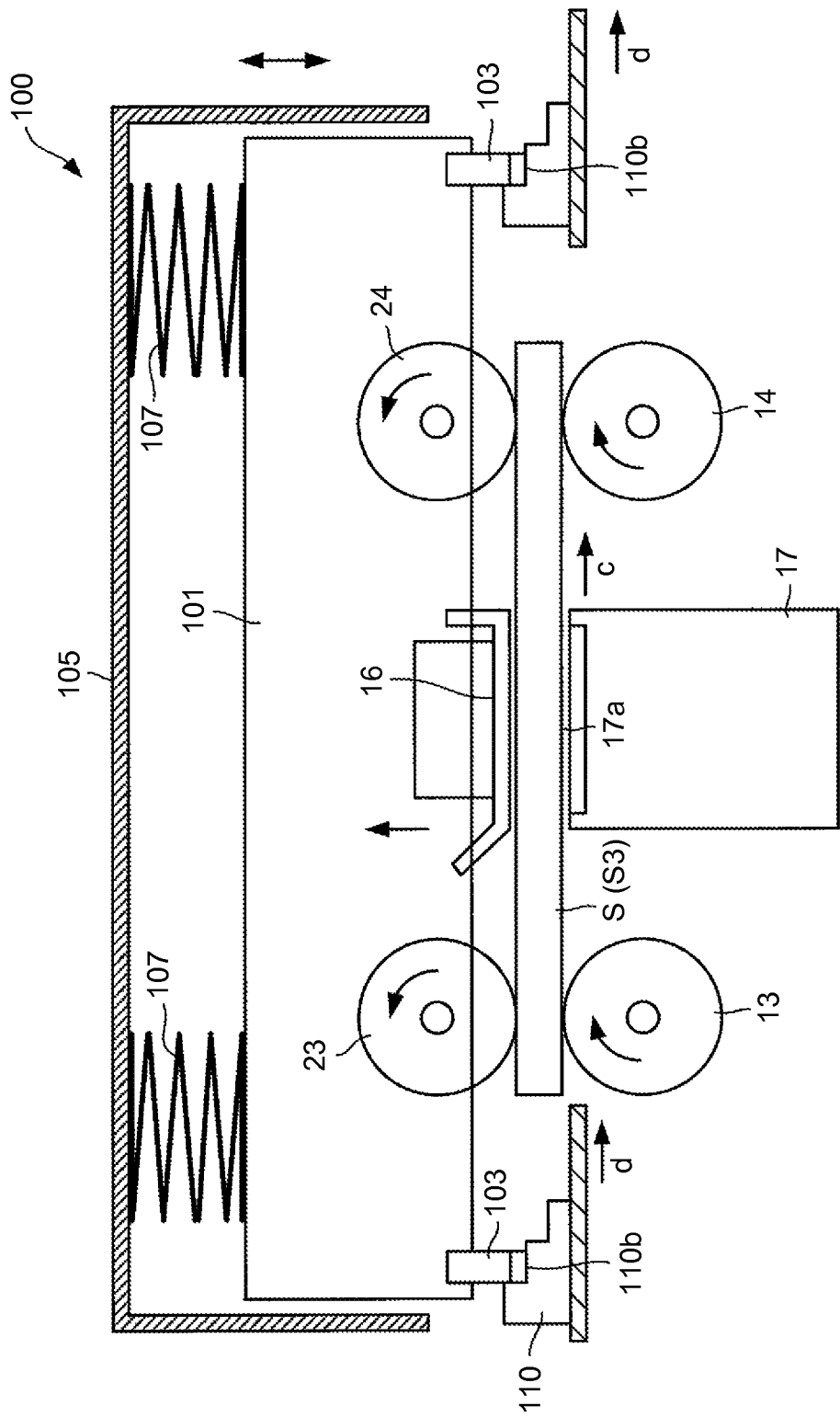
FIG. 7 is a partially cross-sectional view for explaining a conveyance of a document having thickness of a third thickness greater than the second thickness in the document-sheet conveyance device according to the embodiment.
Figure 8:
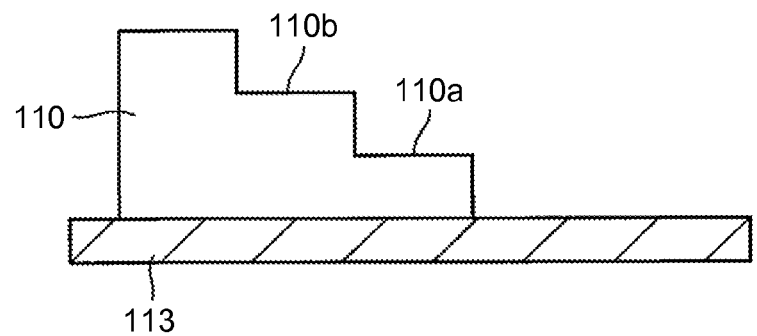
FIG. 8 is a partially cross-sectional view illustrating a configuration of a spacer included in the document-sheet conveyance device according to an embodiment.
Figure 9:
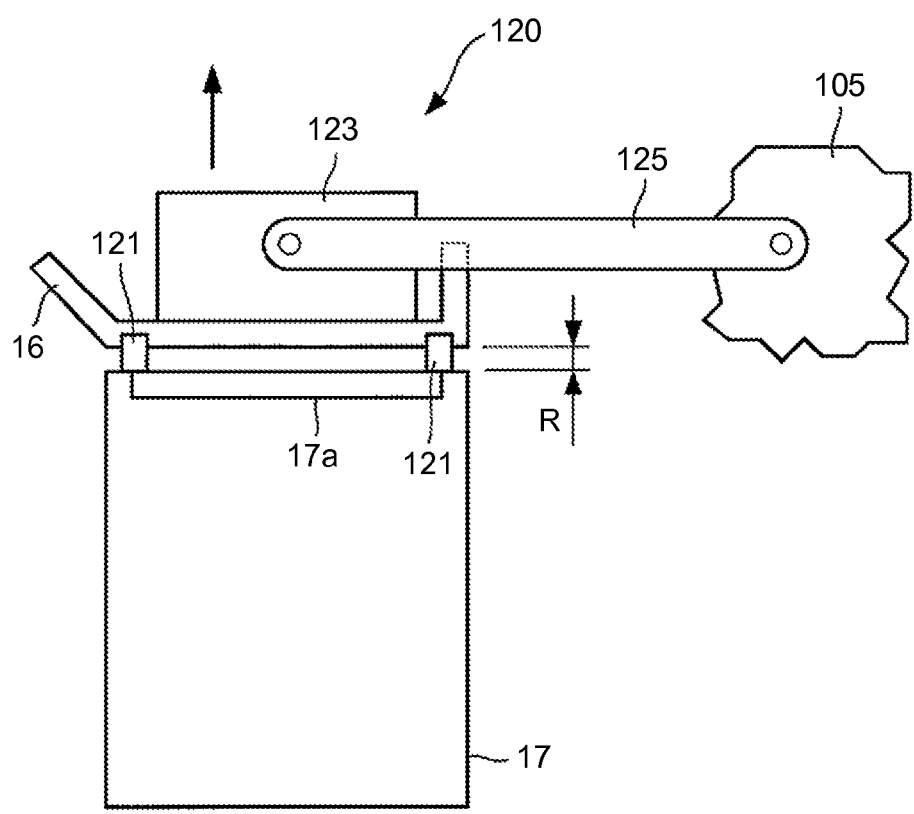
FIG. 9 is a schematic diagram illustrating a configuration of a white plate unit included in the document-sheet conveyance device according to the embodiment.

FIGS. 4 to 7 are critical cross-sectional views for explaining an operation of the document-sheet conveyance device 11, FIG. 8 is a critical cross-sectional view illustrating a spacer 110 included in the document conveyance device 11, and FIG. 9 is a schematic view illustrating a configuration of a white plate unit 120 included in the document conveyance device 11.

Figure 4:
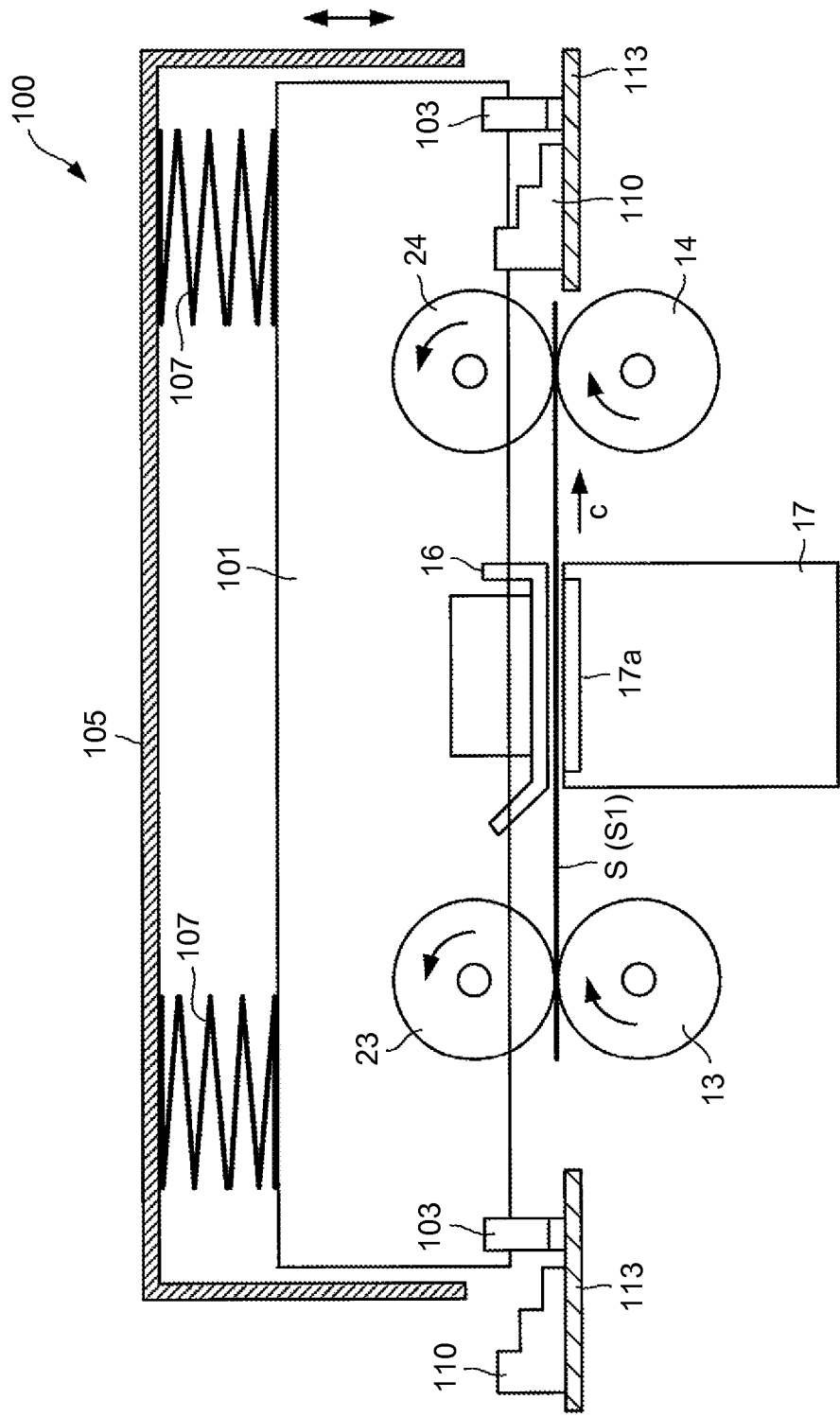
FIG. 4 is a partially cross-sectional view for explaining a conveyance of a document-sheet having thickness of a first thickness in the document-sheet conveyance device according to the embodiment.

The document conveyance device 11 includes a document-sheet conveyance unit 100 shown in FIG. 4, a spacer 110 shown in FIGS. 4 and 8, and a white plate unit 120 shown in FIG. 9.

As shown in FIG. 4, the sheet conveyance unit 100 is placed above the first conveyance roller 13, the second conveyance roller 14 and the reader 17. The sheet conveyance unit 100 includes a roller holding member 101 that holds the first driven roller 23 and the second driven roller 24 so that each rollers are freely rotated, and a cover 105 that covers the roller holding and housing the roller holding member 101. The document-sheet conveyance unit 100 also includes compressing springs 107 that are sandwiched between the roller holding member 101 and the cover 105, and one end of each of the compressing springs 107 is fixed to the roller holding member 101 and other end of each of the compressing springs 107 is fixed to the cover 105.

The cover 105 is held with a housing (not shown) of the document conveyance device 11. The roller holding member 101 is configured to move relative to the cover 105 in a direction orthogonal (up and down directions indicating by the double-headed arrowed line in FIG. 4) to a conveyance direction (indicating by the arrowed line c in FIG. 4) of the document-sheet S. The roller holding member 101 is configured to be depressed downward in the up and down directions shown in FIG. 4 by an elastic forces of the springs 107. Each of the first driven roller 23 and the second driven roller 24 are respectively depressed with elastic forces of not-shown springs other than the compressing spring 107 to the first conveyance roller 13 and the second conveyance roller 14.

The roller holding member 101 includes protrusions 103 that are used to change a gap between the first conveyance roller 13 and the first driven roller 23, as well as a gap between the second conveyance roller 14 and the second driven roller 24 in accordance with the thickness of the document-sheet S. Each of the protrusions 103 is formed in L-shaped form and includes a fixing portion which is rigidly attached on an outer sidewall of the roller holding member 101 and extends in a direction orthogonal to the sheet conveying direction of the document-sheet S, and a supporting portion which extends outward from the outer sidewall of the roller holding member 101 along the sheet conveying direction of sheet S from the fixing portion.

As shown in FIGS. 4 and 8, each of the spacer 110 includes a plurality of supporting planes differing each other in height that are used to support the protrusions 103 of the roller holding member 101. In the embodiment, each of the spacer 110 includes two support planes 110a and 110b that are different in height. Similar to the protrusions 103, the spacers 110 are used to change a gap between the first conveyance roller 13 and the first driven roller 23, as well as a gap between the second conveyance roller 14 and the second driven roller 24 in accordance with the thickness of the document-sheet S. Each of the support planes 110a, 110b of the spacers 110 is set in advance to have predetermined height according to the thickness of the document-sheet S to be processed.

The protrusions 103 and the spacers 110 are not limited to, but are each provided at both end sides of the axis 23a of the first driven roller 23 outward the first driven roller 23, as well as at both end sides of the axis 24a of the second driven roller 24 outward the second driven roller 24, so that four protrusions 103 and four spacers 110 are provided. According to the embodiment, by applying four protrusions 103 and four spacers 110, the holding member 101 can be supported in stable condition.

The spacer 110 is rigidly attached to a guide member 113 that is manually movable in the sheet conveying direction of the document-sheet S. The support planes 110a, 110b of the spacer 110 are formed on the spacer 110 along a moving direction of the guide member 113.

As shown in FIG. 9, a white plate unit 120 includes the white plate 16, a white plate holding member 123 holding the white plate 16, and an arm 125 one end of which is connected rotatably to the white plate holding member 123. The other end of the arm 125 is connected rotatably to the cover 105.

The white plate 16 has projections 121 to maintain a gap between the white plate 16 and the contact glass plate 17a of the reader 17. For example, four projections 121 are disposed on a surface of the contact glass plate 17a, on which the document-sheet S slides, so that each of the four projections 121 are facing each other in both of the sheet conveying direction and in the direction orthogonal to the sheet conveying direction. These four projections 121 are disposed outside of the conveyance path of the document-sheet S so as to avoid interruption of conveyance of the document-sheet.

A gap R is set about 1 mm, for example. The gap R is defined by the projection 121 with no relation to a gap between the first conveyance roller 13 and the first driven roller 23, as well as a gap between the second conveyance roller 14 and the second driven roller 24.

The white plate 16 is configured to be able to turn up by the arm 125 with using the other end of the arm 125 as a fulcrum point of the turning. When the document-sheet S has the thickness greater than the gap R defined by projections 121, the white plate 16 is lifted upward from the contact glass 17a by the forehead of the document-sheet S passing through the contact glass plate 17a. A The white plate 16 is formed so that the bottom face of the white plate 16 is inclined to come closer to the contact glass plate 17a from the end of the document-sheet inserting side to the inside of the white plate 17a. The white plate 16 is also configured to move independently upward and downward relative to the upward and downward moving of the roller holding member 101.

Figure 5:
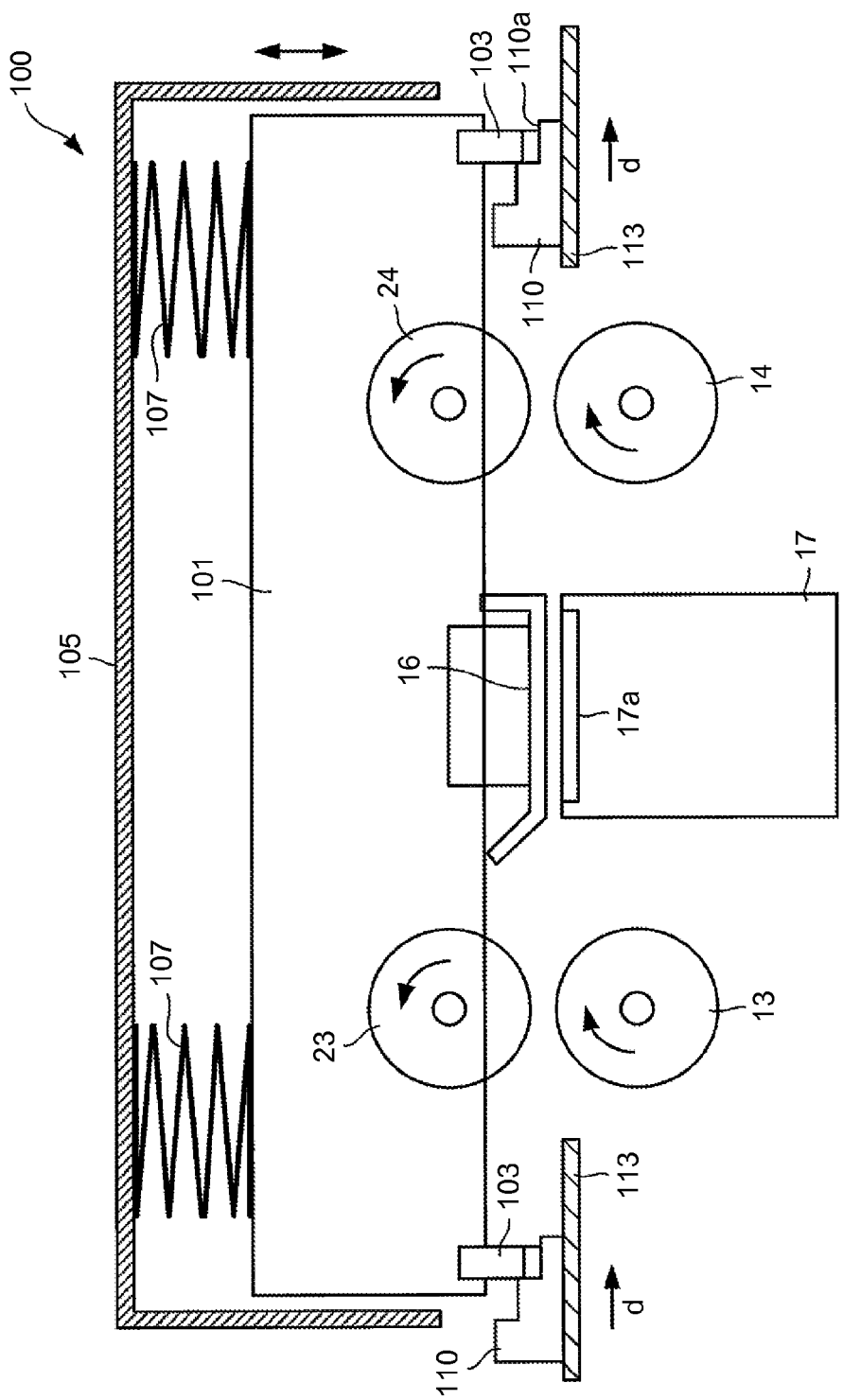
FIG. 5 is a partially cross-sectional view for explaining a conveyance of a document-sheet having thickness of a second thickness greater than the first thickness in the document-sheet conveyance device according to the embodiment.

Operation of the document conveyance device 11 that processes document-sheets S having difference in thickness each other is described below with reference to FIGS. 4 to 7. FIG. 4 illustrates cross-sectional view of a critical portion of the document-sheet conveyance device 11 that processes a thin document-sheet S1 having a first thickness. FIGS. 5, 6 illustrate cross-sectional view of a critical portion of the document-sheet conveyance device that processes a thick document-sheet S2 having a second thickness greater than the first thickness. FIG. 7 illustrates cross-sectional view of a critical portion of the document-sheet conveyance device that processes a thick document-sheet S3 having a third thickness greater than the second thickness. In the embodiment shown in FIG. 4, the document-sheet S1 having a thickness of, for example, about 0.035 mm to 0.6 mm is used as the document-sheet S to be processed. In the embodiment shown in FIGS. 5, 6, the document-sheet S2 having a thickness of, for example, about 5 mm greater than that of the document-sheet S1. In the embodiment shown in FIG. 7, the document-sheet S3 having a thickness of, for example, about 10 mm greater than that of the document-sheet S2.

As shown in FIG. 4, in case using the thin document-sheet S1, a gap R (see FIG. 9) between the white plate 16 and the contact glass plate 17a is maintained about 1 mm by projections 121 of the white plate 16. A gap between the first conveyance roller 13 and the first driven roller 23, and a gap between the second conveyance roller 14 and the second driven roller 24 are each substantially 0 mm in order to apply nipping force to the document-sheet S1. The thin document-sheet S1 is conveyed to the reader 17, while a gap between the white plate 16 and the contact glass plate 17a is maintained about 1 mm, by means of a the pair of first conveyance rollers including the first conveyance roller 13 and the first driven roller 23 and the pair of second conveyance rollers including the second conveyance roller 14 and the second driven roller 24, and the document-sheet S1 is scanned and read by the reader 17.

As shown in FIGS. 5, 6, in case using the thick document-sheet S2, first, the thickness of the thick document-sheet S2 is measured with a caliper or the like in advance.

Next, a given support plane 110a is selected from among a plurality of the support planes 110a, 110b of the spacer 110 according to the thickness of the thick document-sheet S2.

Next, the selected support plane 110a is manually moved so as to face with the protrusions 103 of the sheet conveyance unit 100, and is positioned. The moving of the spacer 110 is performed by moving the guide member 113 to a direction indicated by the arrowed line d along the sheet conveying direction of the document-sheet S2. At this time, the sheet conveyance unit 100 has moved upward from the reader 17 so as not to interrupt the moving of the spacer 110. The moving of the guide member 113 and the moving upward and downward of the sheet conveyance unit 100 are performed manually.

Next, the sheet conveyance unit 100 moves downwardly toward the reader 17 until the protrusions 103 of the sheet conveyance unit 100 abuts the given support plane 110a of the spacer 110, thereby the sheet-conveyance unit 100 is supported by the spacer 110. The moving downward of the sheet conveyance unit 100 is also performed manually. Thereby, a gap between the first conveyance roller 13 and the first driven roller 23, and a gap between the second conveyance roller 14 and the second driven roller 24 can be changed manually. Thus, there is no need to automatically change a gap between the first conveyance roller 13 and the first driven roller 23, and a gap between the second conveyance roller 14 and the second driven roller 24 by using a driving motor such as a stepping motor.

As shown in FIG. 5, a gap R between the white plate 16 and the contact glass plate 17a is maintained about 1 mm by the protrusions 121 of the white plate 16. A gap between first conveyance roller 13 and the first driven roller 23, and a gap between the second conveyance roller 14 and the second driven roller 24 are made less than the thickness of the document-sheet S2 (e.g., about 5 mm) in consideration of applying a pressure to the thick document-sheet S2. In the embodiment, a gap between the first conveyance roller 13 and the first driven roller 23, and a gap between the second conveyance roller 14 and the second driven roller 24 is maintained, for example, about 3.5 mm.

As shown in FIG. 6, the document-sheet S2 is conveyed to the reader 17 by means of the pair of first conveyance rollers including the first conveyance roller 13 and the first driven roller 23, and the pair of second conveyance rollers including the second conveyance roller 14 and the second driven roller 24, and the thick document-sheet S2 is scanned and read by the reader 17.

As it is configured that the white plate 16 is lifted upward from the contact glass plate 17a by the forehead of the document-sheet S2 passing through the contact glass plate 17a, there is no need to change automatically a gap R between the contact glass plate 17a of the reader 17 and the white plate 16 by using a driving motor such as a stepping motor.

In case shown in FIG. 7 using the thick document-sheet S3 having a thickness greater than that of the document-sheet S2, the above-described operation is similarly applied to this case.

First, a thickness of the document-sheet S3 is measured with a caliper or the like in advance. Next, a given support plane 110b is selected from among a plurality of the support planes 110a, 110b of the spacer 110 according to the thickness of the thick document-sheet S3.

Next the selected support plane 110b is manually moved so as to face with the protrusions 103 of the sheet conveyance unit 100, and is positioned. The moving of the spacer 110 is performed by moving the guide member 113 to a direction indicated by the arrowed line d along the sheet conveying of the document-sheet S3. At this time, the sheet conveyance unit 100 has moved upward from the reader 17 so as not to interrupt the moving of the spacer 110.

Next, the sheet conveyance unit 100 moves downwardly toward the reader 17 until the protrusions 103 of the sheet conveyance unit 100 abuts the given support plane 110b of the spacer 110, thereby the sheet-conveyance unit 100 is supported by the spacer 110. Thereby, a gap between the first conveyance roller 13 and the first driven roller 23, and a gap between the second conveyance roller 14 and the second driven roller 24 can be changed manually. Thus, there is no need to automatically change a gap between the first conveyance roller 13 and the first driven roller 23, and a gap between the second conveyance roller 14 and the second driven roller 24 by using a driving motor such as a stepping motor.

A gap R between the white plate 16 and the contact glass plate 17a is maintained about 1 mm by the protrusions 121 of the white plate 16. A gap between the first conveyance roller 13 and the first driven roller 23, and a gap between the second conveyance roller 14 and the second driven roller 24 are made less than the thickness of the document-sheet S3 (e.g., about 10 mm) in consideration of applying a pressure to the thick document-sheet S3. In the embodiment, a gap between the first conveyance roller 13 and the first driven roller 23, and a gap between the second conveyance roller 14 and the second driven roller 24 is maintained, for example, about 8.5 mm.

Next, the document-sheet S3 is conveyed to the reader 17 by means of the pair of first conveyance rollers including the first conveyance roller 13 and the first driven roller 23, and the pair of second conveyance rollers including the second conveyance roller 14 and the second driven roller 24, and the thick document-sheet S3 is scanned and read by the reader 17.

As it is configured that the white plate 16 is lifted upward from the contact glass plate 17a by the forehead of the document-sheet S3 passing through the contact glass plate 17a, there is no need to change automatically a gap R between the contact glass plate 17a of reader 17 and the white plate 16 by using a driving motor such as a stepping motor.

The document conveyance device 11 according to the embodiment is configured as described above, thereby the document conveyance device 11 can obtain the following advantages.

The document conveyance device 11 according to the embodiment is configured to provide a given support plane, which is selected from among a plurality of support planes 110a, 110b of the spacer 110 according to a thickness of the document-sheet S, to cause the roller holding member being supported by the spacers 110, and thereby to change manually a gap between the first conveyance roller 13 and the first driven roller 23, and a gap between the second conveyance roller 14 and the second driven roller 24.

Due to the above-described configuration, a gap between the first conveyance roller 13 and the first driven roller 23, and a gap between the second conveyance roller 14 and the second driven roller 24 can be changed manually, therefore, there is no need to change automatically a gap between the first conveyance roller 13 and the first driven roller 23, and a gap between the second conveyance roller 14 and the second driven roller 24 by using a driving motor such as a stepping motor.

In addition, the document conveyance device 11 according to the embodiment is configured so that the white plate 16 is lifted upward from the contact glass plate 17a by the forehead of the document-sheet S passing through the contact glass plate 17a.

Due to the above-described configuration, the white plate 16 is lifted upward from the contact glass plate 17a based on the thickness of the document-sheet S2 by the forehead of the document-sheet S2 passing through on the contact glass 17a, therefore, there is no need to change automatically a gap R between the contact glass plate 17a of the reader 17 and the white plate 16 by using a driving motor such as a stepping motor.

Furthermore, an inexpensive correction circuit can be sufficiently used, because a correction circuit (e.g., shading correction circuit) of the contact image sensor (CIS) of the reader 17 is always stable (i.e., the distance between the contact glass plate 17a of the reader 17 and the white plate 16 is constant).

That is, in case where the white plate 16 is attached to the roller holding member 101, when the roller holding member 101 is moved upward by the spacer 110, the white plate 16 is moved upward simultaneously, thereby causing a change of the distance between the reader 17 and the white plate 16. Accordingly, there has been need to use shading correction corresponding to the distance having been changed and need to sample data and develop new software including control program. In other words, when a gap between the white plate 16 and the contact glass plate 17a is changed according to a thickness of the document-sheet S, a shading correction circuit different from previous one is required every time. It leads to high cost for developing dedicated software. On the contrary, the document conveyance device 11 according to the embodiment is configured to maintain a distance between the contact glass plate 17a of the reader 17 and the white plate 16 in constant so that a distance between the contact glass plate 17a of the reader 17 and the white plate 16 is unchanged even when the roller holding member 101 is moved upward. Thus, there is no need to provide the shading correction. Although, when the document-sheet S passes through, the white plate 16 may be lifted upward from the contact glass plate 17a due to the thickness of the document-sheet S, existing software including control program can be used by performing shading correction prior to lifting.

Consequently, the document conveyance device 11 capable of reading a plural kind of the document-sheet S in thickness and image forming apparatus 1 including the same can be provided in low cost.

According to the embodiment of document conveyance device 11, a sheet insertion side of the white plate 16 slopes in such a manner as being proximally closer to the contact glass 17a from a distal end of the white plate 16. Thus, white plate 16 can be stably lifted upward from the contact glass 17a by the forehead of the document-sheet S2, S3 passing through the contact glass plate 17a even when the document-sheets S2, S3 have thickness sufficiently greater than common sheet such as sheet S1.

According to the embodiment of the document conveyance device 11, one end of the arm 125 is pivotally connected to the white plate 16 and the other end of the arm 125 is pivotally connected to the cover 105. Thus, a gap R between the white plate 16 and the contact glass plate 17a can be set independently not associating with the changing a gap between the first conveyance roller 13 and the first driven roller 23, and a gap between the second conveyance roller 14 and the second driven roller 24.

In the embodiment above described, the spacer 110 having two support planes 110a, 110b is only exemplary described, the present invention is not limited thereto. For example, the spacer 110 may have one support plane or three or more support planes.

According to an exemplary embodiment of the invention, a low-cost document conveyance device capable of the reading multi-kind of sheets having different thickness and an image forming apparatus including the same can be provided.

According to an aspect of the embodiment of the present invention, it is possible to achieve document conveyance device capable of reading a plural kind sheets in thickness and the image forming apparatus including the same in low cost. It is useful for the image forming apparatus such as a printer, a copier and the like, and a document conveyance device mounted thereon.

What is claimed is:

1. A document-sheet conveyance device comprising:
   a reader configured to read a document-sheet passing through on a contact glass plate;
   a white plate configured to be placed opposite to the contact glass plate;
   a first conveyance roller and a first driven roller placed upstream of the reader in a sheet conveying direction, and configured to nip and convey the document-sheet to the reader;
   a second conveyance roller and a second driven roller placed downstream of the reader in the sheet conveying direction, and configured to nip and convey the document-sheet having been read by the reader to a subsequent stage;
   a holding member configured to hold rotatably the first and second driven roller; and
   a spacer configured to support the holding member and include one or more of support planes different in height; wherein
   a support plane selected from among the one or more support planes of the spacer in accordance with a thickness of the document-sheet is moved manually to support the holding member, and
   the white plate is configured to lift upward from the contact glass plate by a forehead of the sheet passing through the contact glass plate.

2. The document-sheet conveyance device according to claim 1, wherein
   a sheet insertion side of the white plate is configured to slope in such a manner as being proximally closer to the contact glass plate from a head end of the white plate to an inside of the white plate.

3. The document conveyance device according to claim 1, wherein
   the white plate is pivotally connected to one end of an arm, the other end of the arm is pivotally connected to a member other than the holding member.

4. An image forming apparatus including a document-sheet conveyance device, wherein
   the document-sheet conveyance device comprises:
   a reader configured to read a document-sheet passing through on a contact glass plate;
   a white plate configured to be placed opposed to the contact glass;

a first conveyance roller and a first driven roller placed upstream of the reader in a sheet conveying direction, and configured to nip and convey the document-sheet to the reader;

a second conveyance roller and a second driven roller placed downstream of the reader in the sheet conveying direction, and configured to nip and convey the document-sheet having been read by the reader to a subsequent stage;

a holding member configured to hold rotatably the first and second driven roller; and a spacer configured to support the holding member and include one or more of support planes different in height; wherein a support plane selected from among the one or more support planes of the spacer in accordance with a thickness of the document-sheet is moved manually to support the holding member, and the white plate is configured to lift upward from the contact glass plate by a forehead of the sheet passing through the contact glass plate.

* * * * *